Dec. 24, 1935.  C. J. HOLSLAG  2,025,207
WELDING SYSTEM
Filed Oct. 23, 1934
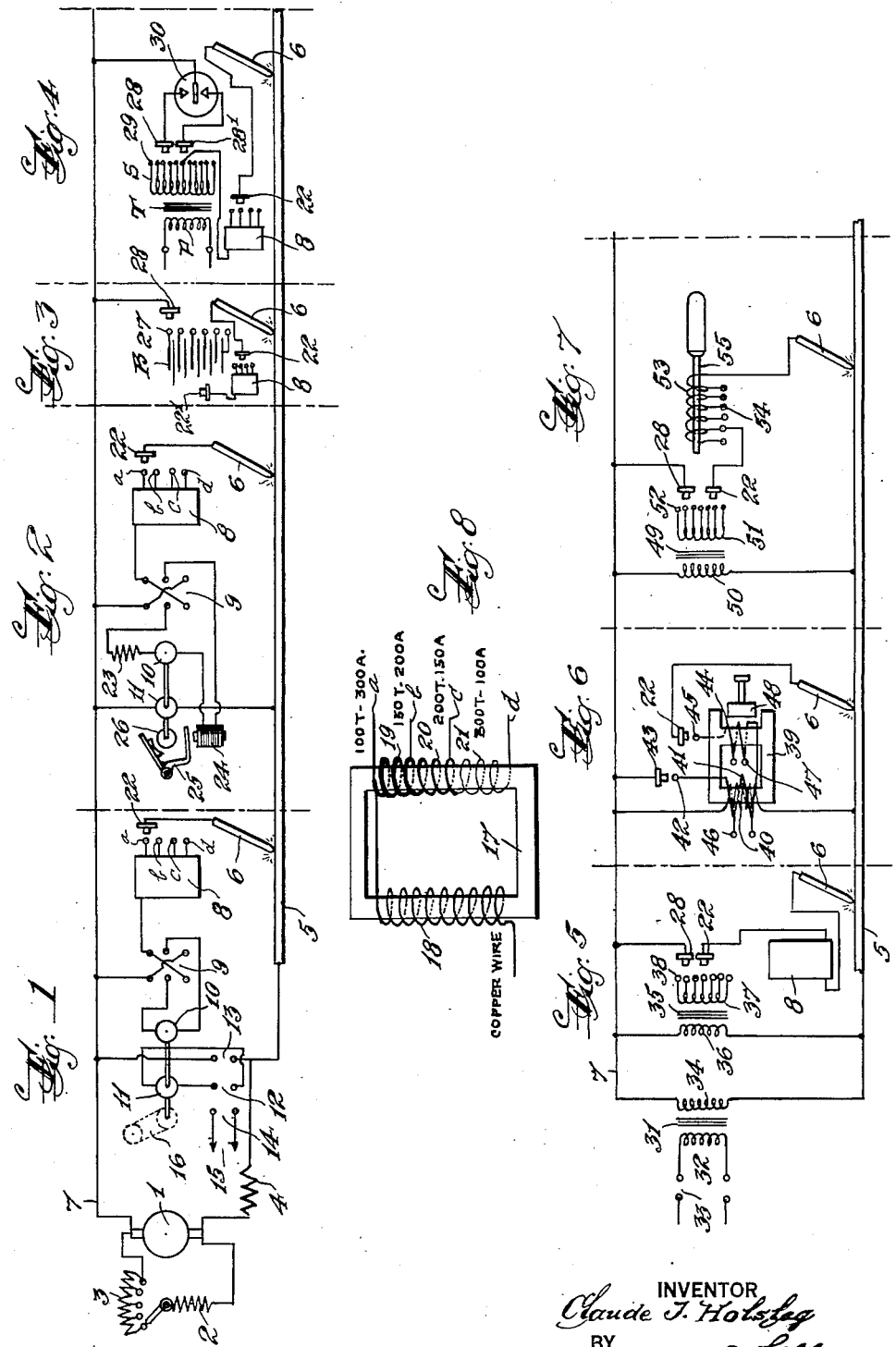
INVENTOR
Claude J. Holslag
BY
A. D. T. Libby
ATTORNEY Patented Dec. 24, 1935

2,025,207

UNITED STATES PATENT OFFICE 2,025,207

WELDING SYSTEM

Claude J. Holslag, South Orange, N. J., assignor to Electric Arc Cutting & Welding Co., Newark, N. J.

Application October 23, 1934, Serial No. 749,524

16 Claims. (Cl. 219—8)

This invention relates to improvements in a multiple operator system of electric welding in which the various operators or welding stations are provided with current from a constant potential source of power.

In general, a multiple operator constant potential arc welding system has many disadvantages which are understood by skilled welders and therefore need not be fully set forth herein, but a few of the disadvantages may be mentioned.

In a multiple operator or station system of the type under discussion, there is great interference between the operators or stations because of the drop in voltage in the main supply leads due to the resistance in the leads, as the current therein varies according to the number of operators or stations that are drawing current from the supply leads. To overcome this great disadvantage to some extent, very heavy leads must be run from the generator or source of supply, which means an increased cost in the first installation. Because of this variation in resistance drop, the current adjustment at the different stations is very unsteady.

Furthermore, in a constant voltage supply system, the operator of any station has no choice of voltage whatever. To illustrate, in welding aluminum a high voltage and low current is required, while many other classes of work require a low voltage and heavy current. Again, in the constant voltage system where resistances and separate reactors at various stations are used, they do not give correct welding current for only one setting.

It is therefore the principal object of my invention to provide, at the different operators' stations, means whereby the operator can adjust at will the voltage to its station and to correct for the resistance drop in the line by adjusting the means of his station to get the correct voltage best suited for the work at hand.

A further object of my improvement is to have means at each operator's station for accomplishing the principal object, which means are independent of the other stations.

Another object of my invention is to provide a compensating reactor for use in the system which will give substantially uniform reactance for the various stations regardless of the amount of current required in the welding circuit at each station.

Another object of my invention is to provide means for each welding station compensating for the line drop and therefore keeping the size of the service leads within reasonable limits.

These and other objects will be apparent to one skilled in the art of welding, after a reading of the following specification taken in connection with the annexed drawing, wherein:

Figures 1, 2, 3 and 4 illustrate a constant potential welding system where the source of power is a constant flat compound wound generator.

Figures 5, 6 and 7 illustrate a system which is supplied with constant potential from an alternating current source of power.

Figure 8 is a diagrammatical view of my compensating reactor which I prefer to use in my improved system.

In Figure 1, 1 is a generator having a shunt field 2 controlled by a rheostat 3. Current is fed from the generator 1 through the series winding 4 to the work 5, on which welding operations are to be performed. The movable electrode 6 is connected to the other supply line 7 through a compensating reactor 8 and a reversing switch 9. Connected to the central points of the reversing switch 9 is a generator 10 driven by a motor 11. The motor 11 may be connected by a switch 12 through the contacts 13 directly across the supply leads of the generator 1, or it may be connected through the switch contacts 14 by the leads 15 to some other suitable source of direct current, or the motor 11 may be driven by a belt drive combination 16. In either case, the motor 11 and generator 10, having suitable characteristics, comprise a booster or subtractor, or means for raising and lowering the voltage of the line current from the generator 1 to the electrode 6. The voltage delivered by the generator 10 may vary from zero to fifteen or twenty volts. Usually the voltage of the main generator 1 is of the order of sixty-five volts, so assuming that the booster or subtractor generator is adjusted for fifteen volts, then in one position of the switch 9 this fifteen volts will be added to the generator voltage sixty-five, adding fifteen volts or a total of eighty volts for use through the reactor 8 and the electrode 6. In the other position of the switch 9, the generator 10 operates to subtract this voltage from the line voltage, making, with the same assumption, fifty volts for application to the reactor 8 and the electrode 6.

In other words, the operator by adjusting the booster or subtractor means at his station, has an independent control over the voltage to be applied to the electrode 6, giving him a range say from fifty to eighty volts, which is entirely independent of the other operator stations.

The reactor 8 is of a special compensating type and is diagrammatically illustrated more clearly in Figure 8. In this figure, the magnetic core 17 has a copper wire winding 18 on one leg, while the winding on the other leg is of resistance wire varying in size and current-carrying capacity, the section 19 being of a size of wire that will continuously carry 200 amperes, while the section 20 is somewhat smaller and has a current-carrying capacity of 150 amperes, whereas the section 21 is a still smaller section for carrying 100 amperes, the turns in each case being arranged so that the taps a, b, c and d provide the same number of ampere turns through the reactor, the tap a being at the junction of the copper wire winding 18, with the resistance wire on the other core leg of the reactor. The resistance winding is so proportioned that only correct ampere current can be obtained on the taps provided. By this arrangement of the windings, I have provided what I believe to be a new feature in a reactance used for arc welding.

It will be seen by this construction of a reactor, that when the operator desires to use a greater or lesser current, all he has to do is to move the plug 22 to the proper socket tap on the reactor for this current, and he is automatically provided with the proper reactance, since for every tap on the reactor the ampere turns are the same and he is provided with the optimum value of reactance for the welding operation to be performed.

In Figure 2, the generator is shown provided with a series winding 23. For controlling the speed of a motor generator set with this condition, an electro-dynamic means may be used in the form of a control magnet 24 operating a break arm 25 to engage the break member 26 connected with the motor 11. In other respects, the arrangement is the same as in Figure 1.

In Figure 3, a battery B is shown as an alternative for the motor generator set of Figures 1 and 2. In this case the battery is provided with a plurality of taps 27 to which the plugs 22' and 28 may be connected in any desired relationship.

In Figure 4, an alternating transformer T is provided having a primary P and a secondary S having taps 29 brought out, to which the plugs 28 and 28' may be connected in any desired relationship. The plugs 28 and 28' are connected to a double-wave rectifier 30 which has its central electrode connected to the main supply lead 7, while the center of the transformer T is connected to the reactor 8 and the electrode 6. Where the source of power is constant potential direct current, as has been described, each station may be provided with any one of the alternative forms of individual station control.

In Figures 5, 6 and 7, the source of current is from a constant potential transformer 31, having a primary 32 connected to a source of supply through a switch 33 and a secondary 34 for supplying current to the main leads 5 and 7.

At the station of Figure 5 an auxiliary transformer 35 is provided having a primary 36 connected across the main supply leads, while the secondary 37 has a plurality of taps 38 which may be connected in any desired relationship with the plugs 22 and 28, whereby the current may be suitably connected through the reactor 8 and electrode 6.

In the station of Figure 6, I have shown a transformer 39 somewhat similar to that shown in my Patent 1,305,363, issued June 3, 1919, having a core 9, on one leg of which the primary 40 is wound, the primary being connected across the main supply leads 5 and 7, and it may have taps if desired, although for clarity they are not shown. One end of the main secondary 41 is brought out to a socket 42 adapted to be connected by the plug 43 to the supply line 7. The other end of the main secondary 41 is connected to the auxiliary secondary 44, the terminal of which is connected to the socket 45. A plug 22 serves to connect the socket 45 to the electrode 6. Taps 46 are provided on the main secondary and taps 47 on the auxiliary secondary. 48 is a movable part of the core for changing the reactance of the secondary of the transformer. By this arrangement the special reactor 8 is not required, and by shifting the plugs 22 and 43, the transformer may be made to add and subtract voltage from the line as in Figure 5.

In Figure 7 the transformer 49 and the primary 50 are connected across the line, while the secondary 51 has taps 52 which may be properly connected through the medium of the plugs 22 and 28 to provide an adding or subtracting voltage through the reactor to the electrode 6. In Figure 7 I have shown a reactor of somewhat different type than in Figure 8. In other words, the reactor of Figure 7 has a winding 53, with taps 54 and a movable core 55.

In the various figures, it will be seen that I have shown certain alternative means of arriving at the same general result; that is, the provision of means at each individual station in the multiple arc station welding system for attaining the objects of my invention.

What I claim is:

1. A welding system including a main source of current having substantially a constant voltage normally sufficient to strike and maintain an arc under ordinary welding conditions and means at a welding station for directly adding to or subtracting from the voltage of said main source of current an auxiliary voltage having a range adjustable at will by the station operator to meet variable requirements of said welding station.

2. A welding system including a main source of current having substantially a constant voltage normally sufficient to strike and maintain an arc under ordinary welding conditions and means at a welding station for directly adding to or subtracting from the voltage of said main source of current an auxiliary voltage with means at the station for manually adjusting its voltage within a given range to suit the welding requirement of the welding station.

3. A multiple-station welding system including a main source of current having substantially a constant voltage normally sufficient to strike and maintain an arc under ordinary welding conditions and an auxiliary source of current at each station for directly adding or subtracting a voltage considerably lower than the main voltage to or from the main voltage, said auxiliary voltage having a range adjustable at will by the station operator to meet variable welding requirements at its station.

4. A multiple-station welding system including a main source of current having substantially a constant voltage normally sufficient to strike and maintain an arc under ordinary welding conditions and an auxiliary source of current at each station and under the control of the operator thereat for directly adding or subtracting a voltage to or from the main voltage, said auxiliary voltage having a range to meet variable welding requirements at its station, and a reactor in each station welding circuit, said reactor having windings and taps therefrom arranged so the ampere turns on the reactor are substantially constant for all taps.

5. A welding system including a main source of current having substantially a constant voltage normally sufficient to strike and maintain an arc under ordinary welding conditions and means at a welding station and under the control of the operator thereat for directly adding or subtracting to or from the voltage of said main source of current an auxiliary voltage having a range to meet variable requirements of said welding station, and a reactor at the welding station in the welding circuit, said reactor being provided with means whereby the reactance will be substantially constant for different current values in the station welding circuit.

6. A multiple-station arc welding system having a constant potential main source of current normally sufficient to strike and maintain an arc under ordinary welding conditions, an auxiliary source of current at each welding station with independent means at said stations for connecting and adjusting said auxiliary source to raise or lower the potential of the main source of current as used in the arc welding circuit at said station according to the welding requirements thereof.

7. A multiple-station arc welding system having a constant potential main source of current normally sufficient to strike and maintain an arc under ordinary welding conditions, an auxiliary source of current at each welding station with independent means at said stations for connecting and adjusting said auxiliary source to raise or lower the potential of the main source of current as used in the arc welding circuit at said station according to the welding requirements thereof, and a reactor in said station welding circuit, said reactor having windings so constituted and arranged with taps that for all connections to the reactor the ampere turns of the reactor remain constant.

8. A multiple-station arc welding system having a constant potential main source of current normally sufficient to strike and maintain an arc under ordinary welding conditions, an auxiliary source of current and a self-compensating reactor in the station arc circuit, and means for connecting said auxiliary source of current and adjusting the voltage thereof within a given range so as to raise or lower the main voltage used at the welding station.

9. A welding system as set forth in claim 8, characterized in that the reactor has a substantially constant number of ampere turns for all working connections thereto.

10. A multiple-station arc welding system as set forth in claim 6, further characterized in that said auxiliary source of current at each station has a voltage range of the order of zero to twenty, while the voltage of the main source of current is of the order of approximately sixty-five.

11. A multiple-station arc welding system as set forth in claim 6, further characterized in that said auxiliary source of current at each station has a voltage range very much lower than the voltage of the main source of current.

12. In an arc welding system, a source of current having substantially a constant potential normally sufficient to strike and maintain an arc under ordinary welding conditions with main feeders extending from said source to a plurality of welding stations, welding circuits at each station bridged across said main feeders, each of said welding circuits including a reactance and an auxiliary source of current with means at the station for manually connecting and adjusting the source so its potential will add to or subtract from that supplied by said feeders according to the welding needs of said station.

13. An arc welding system as set forth in claim 12, further characterized in that the reactance comprises a core of magnetic material with windings of a kind and so disposed that the ampere turns on the reactor for different currents taken through the reactor, are substantially constant.

14. An arc welding system as set forth in claim 12, further characterized in that the reactance comprises a core of magnetic material with a winding of relatively low resistance wire on the core, and a winding of relatively high resistance also on the core, and connected in series with the low resistance winding.

15. An arc welding system as set forth in claim 12, further characterized in that the reactance comprises a core of magnetic material with a winding of relatively low resistance wire on the core, and a winding of relatively high resistance on the core in series with the low resistance winding, said second winding having portions of different cross-sectional area and current-carrying capacity, the larger current capacity portion of the high resistance winding being connected to the low resistance winding, and the smaller current capacity portion being at the extremity of said high resistance winding as and for the purposes described.

16. An arc welding system as set forth in claim 12, characterized in that the reactance includes a core of magnetic material having windings of a kind and arranged thereon so the reactor will deliver the correct welding characteristics at all settings or taps on the reactor.

CLAUDE J. HOLSLAG.